Feb. 4, 1941. A. J. THOWLESS 2,230,275
ROCK DRILL
Original Filed Aug. 25, 1933 2 Sheets-Sheet 1
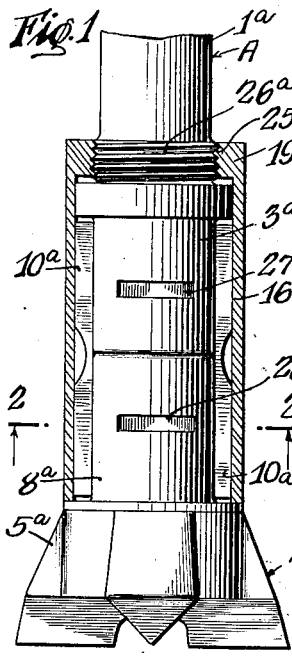
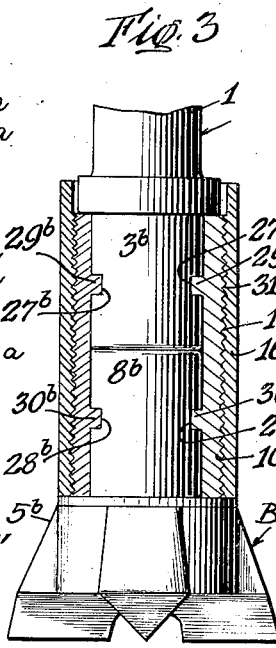
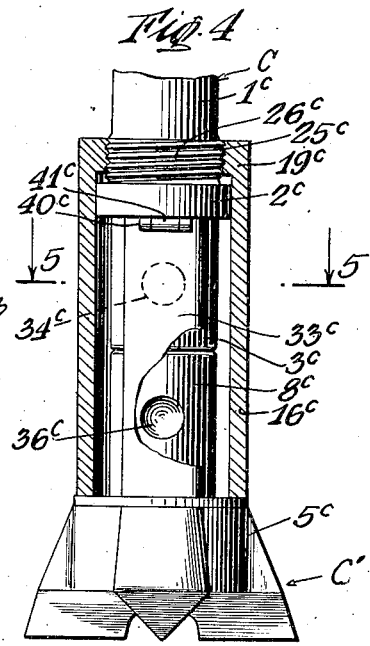
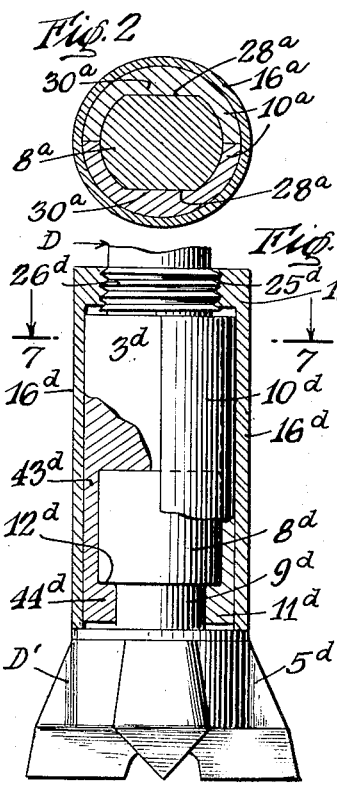
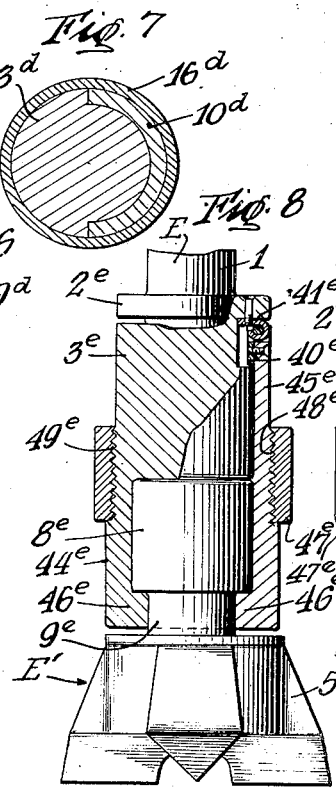
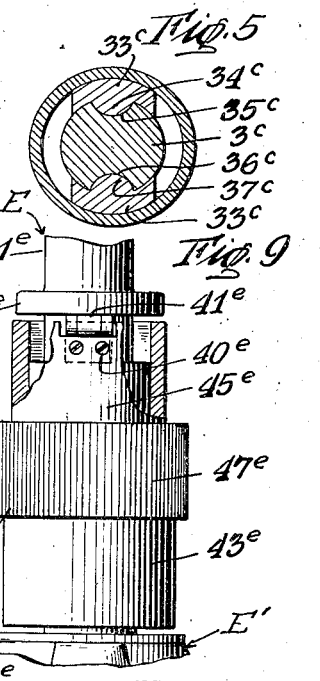
INVENTOR
Arthur J. Thowless
BY
Albert M. Austin
ATTORNEY

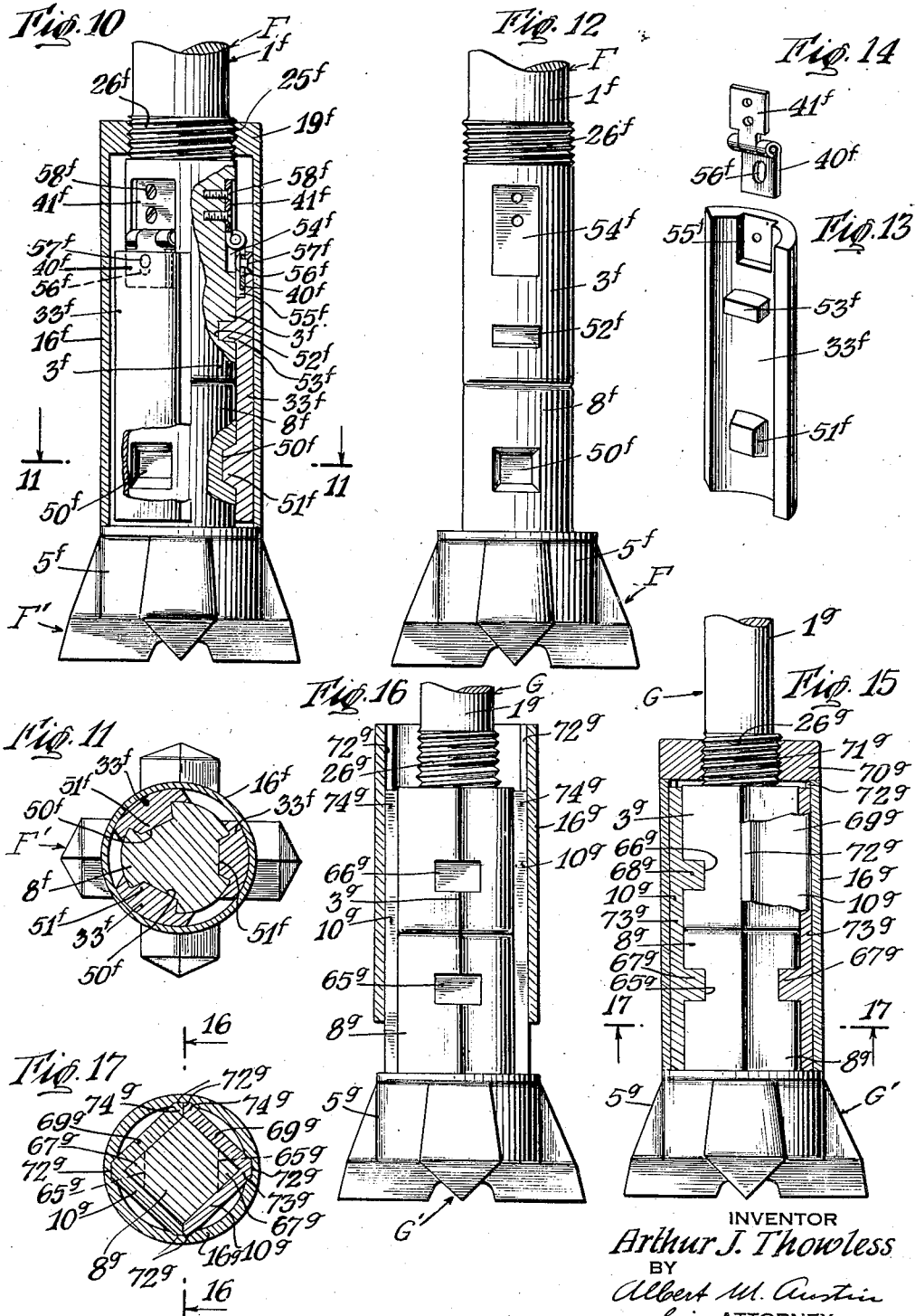

Patented Feb. 4, 1941

2,230,275

UNITED STATES PATENT OFFICE 2,230,275

ROCK DRILL

Arthur J. Thowless, Newark, N. J.

Original application August 25, 1933, Serial No. 686,677. Divided and this application July 17, 1937, Serial No. 154,117

5 Claims. (Cl. 255—63)

This invention relates to rock drills and more particularly to a rock drill having means associated therewith permitting attachment and detachment of the bit. This application is a division of my copending application Serial No. 686,677, filed August 25, 1933, now Patent No. 2,089,230, issued August 10, 1937.

Rock drills are subjected to considerable shock incident to the drilling operation. In rock drills of the detachable drill bit type heretofore made, the shock from the drill bit is transferred indirectly to the drill shaft through the bit attaching device. For example, one type of detachable bit now in use is provided with a threaded shank which screws into a threaded sleeve connected to the drill stem. The shock incident to drilling is thus transferred to the threaded parts of the bit shank and sleeve with the result that the threads become so hammered and worn that it is difficult to remove the bit or replace the bit onto the drill stem. In addition to these defects, much of the working force desired to be transferred to the drill bit is lost effort and does not perform effective work. Detachable bits as heretofore made have been unduly complicated and expensive and have required extensive machining and milling to manufacture them. The detaching devices heretofore used are otherwise complicated, difficult to manipulate and quickly wear out.

Drill bits also quickly wear out when operating on hard surfaces and must be replaced with a new bit. It is advantageous, therefore, to provide a drill bit which can be made as sturdy as possible and at a minimum of cost.

In accordance with this invention, a drill stem and drill bit combination is provided wherein the shocks incident to drilling are transferred directly from the drill stem to the drill bit. The drill bit is strong and sturdy in construction and can be inexpensively made by a simple drop forging operation. The drill shank abuts directly against the broad end of the drill stem and is held thereto by simple attaching devices which securely hold the drill bit to the drill stem. The connecting device comprises one or more separable members provided with parts which engage and interfit with corresponding locking parts provided on the drill stem and drill bit. The connecting members are held in place by a sleeve or ring which telescopes over the member. The connecting devices are not affected by the shocks incident to drilling and as a result may be made of relatively light material. The drill bit may be easily and quickly attached and detached by an unskilled operator.

An object of this invention is to provide a detachable drill stem and drill bit combination in which the shocks incident to drilling are transferred from the drill stem directly to the drill bit.

Another object of this invention is to provide means which may be easily and quickly manipulated by an unskilled operator to attach and detach the drill bit and drill stem.

Another object of this invention is to provide a detachable drill bit which is strong and durable and which may be made at a minimum cost.

Still another object of this invention is to provide adjustable means for securely holding the detachable drill bit to the drill stem which is composed of few parts, inexpensive to manufacture, which securely holds the bit in position during operation, and which may be easily and quickly manipulated by an unskilled operator when attachment or detachment of the drill bit is desired.

Other objects of this invention will become apparent as the disclosure proceeds.

In order that a clearer understanding of my invention may be had, attention is hereby directed to the accompanying drawings, forming a part of this application and illustrating certain possible embodiments of my invention.

Referring to the drawings:

Fig. 1 is a side view of my detachable bit and drill stem combination, certain parts of the connecting means being broken away to illustrate certain features of the construction;

Fig. 2 is a horizontal cross-sectional view through the drill bit and associated attaching means, taken on line 2—2 of Fig. 1;

Fig. 3 is another side view of the drill bit and drill stem combination shown in Fig. 1, modified means being shown for detaching and connecting the drill bit to the drill stem;

Fig. 4 is a side view of a further modification of the drill bit and drill stem and associated securing devices;

Fig. 5 is a horizontal cross-sectional view through the drill stem and securing devices shown in Fig. 4, this view being taken on line 5—5 of Fig. 4;

Fig. 6 is a side view of a modified form of drill stem showing a modified form of drill bit attaching means adapted for this type of construction;

Fig. 7 is a horizontal cross-sectional view through the drill stem and associated securing means shown in Fig. 6, this view being taken on line 7—7 of Fig. 6;

Fig. 8 is a side view of a drill stem of the type shown in Fig. 6 having drill bit-attaching means associated therewith of modified form;

Fig. 9 is another side view of the drill stem and associated drill bit shown in Fig. 8.

Fig. 10 is a side view of a drill stem and drill bit combination having a plurality of hinged members associated therewith for securing the drill bit to the drill stem;

Fig. 11 is a horizontal cross-sectional view through the drill bit and associated attaching devices shown in Fig. 10, this view being taken on line 11—11 of Fig. 10;

Fig. 12 is a side view of the drill stem and drill bit shown in Fig. 10 with the attaching devices removed;

Fig. 13 is a perspective view of one of the hinged members comprising the drill bit locking devices shown in Fig. 10;

Fig. 14 is a perspective view of the hinge shown in Fig. 10 which is attached to the drill stem and the locking member, as shown in Fig. 10;

Fig. 15 shows a drill bit and drill stem combination of polygonal cross-section having suitable securing devices associated therewith, the securing devices being shown broken away and in cross-section to illustrate the construction;

Fig. 16 is a side view of the drill stem and drill bit combination with the attaching sleeve removed from its seating position; and Fig. 17 is a horizontal cross-sectional view through the drill bit and associated securing devices shown in Fig. 15, this view being taken on line 17—17 of Fig. 15.

Similar reference characters refer to similar parts throughout the several views of the specification and drawings. In the several embodiments illustrated herein, the several parts having generally similar and corresponding constructions and functions are indicated respectively by similar reference characters but with letter suffixes denoting the particular embodiments respectively.

There is shown in Figs. 1, 2 and 3, a rock drill stem A and a detachable drill bit A'. The drill stem A is reciprocated by suitable driving mechanism, well known in the art, so as to deliver hammer-like blows to the drill bit A'. The drill stem A comprises a stem portion 1a having a drill head 3a. The drill bit A' comprises a shank portion 8a of reduced cross-section and cutting parts 5a of enlarged cross-section. It will be noted that the end surface of the drill head 3a is substantially flat and abuts the flat adjacent surface of the shank portion 8a of the drill bit A'. The drill stem A and the drill bit A' are connected together by a pair of connecting members or half portions 10a. The drill head 3a is provided with one or more horizontally extending slots 27a which receive corresponding projections (similar to the projections 29 shown in Fig. 2) extending from the half portions 10a and slots 38a which receive projections 30a. When the half portions 10a are applied and seated within the corresponding recesses 27a provided in the drill head 3a and the corresponding recesses 28a provided in the bit head 8a, the drill bit is securely held and locked to the drill stem 1a when the tubular sleeve 16a is applied. By referring more particularly to Fig. 2, it will be noted that in this type of locking device the drill bit A' is held firmly to the drill stem and cannot rotate.

Drill bits require frequent sharpening and must often be replaced with fresh bits. The securing devices as above described may be easily and quickly manipulated by the unskilled workman to permit ready detachment and attachment of the drill bit. The drill stem A delivers directly the successive impacts or blows to the head 8a of the drill bit as the drilling operation proceeds. It will be noted that the shocks or blows incident to drilling are delivered directly from the drill stem A to the drill bit A' and substantially no strain or shock is placed upon the drill bit connecting device. Their only function is to support and hold the drill bit A' in fixed abutment against the drill head 3a of the drill stem 1a.

There is shown in Fig. 1, means which may be employed for securing the sleeve 16a in operative position. In the form shown in Fig. 1 the drill stem 1a is provided with a threaded portion 26a onto which the threads 25a provided on the collar 19a of the tubular sleeve 16a may be screwed. This is an inexpensive type of construction and in certain instances may find special recommendation.

In a similar manner, the devices illustrated in Figs. 4, 6 and 10 are provided with sleeves 16b, 16c, 16d, 16f and 16g, respectively, having threads 25b, 25c, 25d, 25f and 25g on collars 19b, 19c, 19d, 19f and 19g cooperating with threaded portions 26b, 26c, 26d, 26f and 26g.

As a further modification there is shown in Fig. 3 a tubular sleeve 16b, the inner surface of which is provided with threads 130b which are adapted to screw over threads 31b provided on the outer surface of the half portions 10b. The remaining portions of this embodiment of the invention are similar to the corresponding portions of the form illustrated in Fig. 1, there being a drill stem B having a stem portion 1b formed with a drill head 3b and a drill bit B' having a cutting portion 5b and a shank portion 8b. The drill head 3b is provided with slots 27b to receive projections 29b on half portions 10b and the shank portion 8b is provided with slots 28b to receive projections 30b.

Under certain circumstances objection to the use of the separable half portions 10 may be raised on the ground that the parts can be dropped or lost during attachment or detachment of the drill bit. To overcome this objection a modified form of drill bit connecting means, as shown in Figs. 4 and 5, may be provided which comprises members 33c which are hinged at the upper end thereof to the collar portion 2c of the drill stem 1c. Any suitable form of hinge may be provided for the purpose, as for example, a leaf hinge, one leaf 40c of which is secured to the connecting member 33c and the outer leaf 41c to the shoulder portion 2c. One or more members 33c may be provided, as shown in Fig. 5, which need extend only partially around the circumferential area of the drill head 3c and the bit head 8c. Where the hinge type of connection is used, rounded projecting portions 34c and 37c extending from the members 33c are preferably provided to facilitate entry into the corresponding sunken recesses 35c and 36c provided respectively in the drill head 3c and the bit head 8c. The tubular sleeve 16c telescopes over the hinged members 33c as before and retains the same in locked position with respect to the drill head and drill stem.

If desired, drill bit connecting means may be provided which comprises only one removable half portion 10d, as shown in Fig. 6. In this type of construction the drill head 3d is provided with a downwardly projecting flange 43 formed integral therewith and provided with a shoulder portion 44d which seats against the shoulder 12d of the bit head 8d. The shoulder portion 44d of the flange 43d corresponds respectively to the shoulder portion 11 of the half portion 10d. The drill bit D' is removed by unscrewing the threaded portion 19d of the sleeve 16d, lifting the sleeve from its telescoping position over the half portion 10d, removing the half portion 10d and lifting the drill head 8d of the drill bit D' from its seating position within the retaining flange 43d.
In this type of construction it is only necessary to manipulate one-half portion 10d to remove or replace the drill bit.

Fig. 8 shows a drill stem of the type shown in Fig. 6 but having associated therewith a hinged locking member 45e of the general type shown in Fig. 4. The hinged locking member 45e is connected to the shoulder portion 2e by means of a hinge, one leaf 40e of which is secured to the locking member 45e and the other leaf 41e to the shoulder portion 2e. The locking member 45e may comprise a half portion as shown in Fig. 9 or less than a half portion as shown more particularly in Figs. 4 and 5. The locking member 45e is provided with a shoulder portion 46e at the free end thereof which snugly fits around the neck portion 9e of the drill bit E'.

As shown more particularly in Figs. 8 and 9, a modified form of tubular sleeve 47e may be provided which comprises a tubular band or ring which extends only partially over the associated drill bit connecting members. The ring member 47e may be provided with threads 48e which are adapted to screw over threads 49e provided on the outside surface of the connecting means comprising the locking member 45e and the locking flange 43e.

A further modified form of drill bit connecting means is shown in Figs. 10 to 14 inclusive. There is here shown three connecting members 33f each provided with studs 51f which fit within pickets 50f provided in the bit head 8f and studs or projections 53f which fit within pockets 52f provided in the drill head 3f. The connecting members 33f are attached to the drill head 3f by means of a hinge shown more particularly in Fig. 14. In order to permit the connecting members 33f to fit snugly around the bit head 8f and the drill head 3f, I prefer to provide a recess 54f in the drill head which receives the hinge leaf 41f and a recess 55f on the inside face of the connecting member 33 which receives the hinge leaf 40f, as shown more particularly in Fig. 10. Machine screws 58f or other suitable means are used to connect the hinge leaf 41f to the drill head 3f.
The hinge leaf 40f is provided with an elongated slot 56f which receives a stud 57f projecting from the recess portion 55f of the connecting member 33f. The stud 57f permanently holds the connecting member 33f in hinged position but the slot 56f permits vertical adjustment or movement of the connecting member 33f with respect to the drill head 3f and the bit head 8. It is thus seen that this vertical adjustment of the connecting members 33f permits the stud portions 51f and 53f to lock themselves within the corresponding pockets 50f and 52f provided respectively on the bit head and the drill head. When thus attached the drill bit is held in proper connected position to the drill stem entirely through the agency of the projecting studs 51f and 53f, leaving the hinge free from strain. The projecting studs 51f and 53f are shaped so as to facilitate their entry into the corresponding pockets 50f and 52f provided respectively in the bit head and drill head. The connecting members 33f may completely surround the drill head 3f and the bit head 8f, or only partially surround the same in the manner shown more particularly in Fig. 11.

There is shown in Figs. 15, 16 and 17, a drill head 3g and bit head 8g of polygonal cross-section. The half portions 10g snugly fit around the polygonal drill head and bit head and accordingly are provided with flat sides 69g. This construction prevents possible turning of the drill bit. The drill head 3g and the bit head 8g may be provided with horizontal slots 65g and 66g respectively which receive corresponding projections 67g and 68g extending from the half portions 10g. The projections 67g and 68g further assist in preventing turning or rotating movement of the drill bit when in operative position.

The tubular sleeve 16g is provided with a plurality of trackways 72g within which the corners 73g and the edges 74g of the half portions 10g slide. Thus the half portions 10g contact the inside surface of the tubular sleeve 16g at few points only. This type of construction is advantageous where the sleeve 16g is inclined to rust or stick to the half portions, making it difficult to remove the same. Since the sleeve contacts the half portions at few points only, the friction between these parts, which resists removal of the sleeve, is greatly reduced.

As a possible further modification, the tubular sleeve 16g may be held in telescoped position over the half portions 10g by means of a nut 70g, shown more particularly in Fig. 15. The nut 70g seats over the sleeve 16g and is provided with threads 71g which engage threads 26g provided on the drill stem 1g.

The various locking projections 29b and 30b shown in Fig. 3, projections 34c and 37c shown in Figs. 4 and 5, projections 44d shown in Fig. 6, projections 51f and 53f shown in Figs. 10 and 13, and projections 67g and 68g shown in Fig. 15, may be of any desired and convenient shape or form. It is further understood that these projections may be formed either on the movable connecting devices as shown, or they may be formed directly on the bit shank and drill stem, in which case the corresponding receiving sockets would be formed on the movable connecting means. Various modifications may be thus made both as to the shape and position of the locking projections and associated receiving pockets.

It is understood that the various parts and details above described and disclosed in the accompanying drawings may be used in various different combinations within the purview of this invention. By way of example only, there is shown in Figs. 1, 3, 8 and 15, different forms of tubular sleeves and associated means for locking the sleeves in position. These various types of sleeves may be used interchangeably with the various types of drill stems, as shown in Figs. 1, 4, 6, 8, 10 and 16. Similarly, the various connecting devices, as shown in Figs. 1, 4, 6, 8, 10 and 16 may be used interchangeably and in combination with the different types of tubular sleeves and drill stems as above described. While detachable drill bit and drill stem combinations herein disclosed are all effective, practical and inexpensive to make, it will be understood that certain types herein shown may be more effective and more practical for certain conditions than others. In all the forms the drill bit may be inexpensively made by a simple drop forging operation, no machine work of any kind thereon being required. The drill stems, which is a permanent part of the drilling equipment, carries and supports the connecting mechanism which is a permanent part of the fixture. The shock incident to drilling is transferred directly from the drill stem to the drill bit, thus maximum efficiency is attained with a minimum of wear and tear on the parts.

The connecting means herein disclosed may also be associated with rock automatic hammers and similar devices. Where the expression "rock drill" is herein used, therefore, it is understood to imply and encompass automatic hammers and similar devices.

While certain novel features of the invention have been disclosed and are pointed out in the annexed claims, it will be understood that various omissions, substitutions and changes may be made by those skilled in the art without departing from the spirit of the invention.

What is claimed is:

1. Rock drill apparatus including in combination, a drill stem and detachable one-piece drill bit connected therewith, said bit having an enlarged cutting portion and a reduced shank, said shank having a substantially flat surface arranged to abut the substantially flat surface provided at the end of said drill stem, means connecting said stem and shank including a hinged member fitting and overlapping the abutting ends of said stem and shank, and a cooperating projection and recess associated with said member and bit shank operative to detachably connect the same, and a single tubular sleeve telescoping over said member, said sleeve having a threaded connection for retaining it in a position wherein it is operative to retain the hinged member in stem and shank connecting position, the adjacent ends of said hinged member and said sleeve being spaced from said cutting portion so that blows delivered to said drill stem are imparted directly to the flat end surface of the bit shank.

2. Rock drill apparatus including in combination, a drill stem and a detachable one-piece drill bit associated therewith, said bit having an enlarged cutting portion and a reduced shank, said shank having a substantially flat surface arranged to abut the substantially flat surface provided at the end of said drill stem, a flange extending from the end of said drill stem providing a fixed pocket for said bit shank, a detachable member connecting said stem and shank, said drill stem and said detachable member being shaped to permit turning of said shank thereon, and a tubular sleeve telescoping over said member to removably retain the same in stem and shank connecting position, the lower end of said flange and said sleeve being spaced from said cutting portion so that blows delivered to said drill stem are imparted directly to the flat end surface of the bit shank.

3. Rock drill apparatus including in combination, a drill stem and detachable one-piece drill bit associated therewith, said bit having an enlarged cutting portion and a reduced shank, said shank having a substantially flat solid end surface arranged to abut the substantially flat solid end surface of said drill stem, means detachably connecting said drill stem and bit shank, said connecting means including a connecting member fitting and overlapping the abutment ends of said drill stem and bit shank, and a cooperating projection and recess associated with said member and bit shank, a retaining sleeve telescoping over said connecting member to releasably retain the same in connecting position, and means attaching said connecting member to said drill stem for movement into and out of connecting position, said attaching means being operative to retain said connecting member in attachment with said drill stem when said retaining sleeve is removed from retaining position, the lower end of said connecting member and said sleeve being spaced from said cutting portion so that the blows delivered to said drill stem are imparted entirely to the flat end surface of the bit shank.

4. Rock drill apparatus including in combination, a drill stem and detachable one-piece drill bit connected therewith, said bit having an enlarged cutting portion and a reduced shank, said shank having a substantially flat end surface arranged to abut the substantially flat end surface of the end of said drill stem, means detachably connecting said stem and shank including a connecting member fitting and overlapping the abutting ends of said stem and shank, and a cooperating projection and recess associated with said member and bit shank, a tubular retaining sleeve telescoping over said connecting member operative to retain the same in stem and shank connecting position, and means attaching said connecting member to said drill stem for movement into and out of connecting position, said attaching means being operative to retain said connecting member in attachment with said drill stem when said retaining sleeve is removed from retaining position, and means for preventing removal of said retaining sleeve over the bit end of said drill stem, the lower end of said connecting member and said sleeve being spaced from said cutting portion so that blows delivered to said drill stem are imparted entirely to the flat end surface of the bit shank.

5. Rock drill apparatus including in combination, a drill stem and a detachable one-piece drill bit associated therewith, said bit having an enlarged cutting portion and a reduced shank, said shank having a substantially flat surface arranged to abut the substantially flat end surface of the end of said drill stem, a flange extending inwardly at the end of said drill stem providing a fixed pocket for said bit shank, said shank having a shoulder directly engaging said flange, a connecting member connecting said stem and shank, a tubular retaining sleeve telescoping over said connecting member to removably retain the same in stem and shank connecting position, and means attaching said connecting member to said drill stem for movement into and out of connecting position, said attaching means being operative to retain said connecting member in attachment with said drill stem when said retaining sleeve is removed from retaining position, the lower end of said flange and said sleeve being spaced from said cutting portion so that blows delivered to said drill stem are imparted entirely to the flat end surface of the bit shank.

ARTHUR J. THOWLESS.